United States Patent
Otozawa et al.

(10) Patent No.: US 8,017,709 B2
(45) Date of Patent: Sep. 13, 2011

(54) FLUORINATED POLYMER AND FLUORINATED POLYMER COMPOSITION CONTAINING IT

(75) Inventors: Nobuyuki Otozawa, Tokyo (JP); Toyomichi Shimada, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 470 days.

(21) Appl. No.: 12/168,197

(22) Filed: Jul. 7, 2008

(65) Prior Publication Data
US 2008/0293863 A1    Nov. 27, 2008

Related U.S. Application Data

(63) Continuation of application No. PCT/JP2006/32511, filed on Dec. 15, 2006.

(30) Foreign Application Priority Data

Jan. 5, 2006  (JP) .................................. 2006-000324

(51) Int. Cl.
C08F 14/18    (2006.01)
C08F 114/18   (2006.01)
C08F 214/18   (2006.01)

(52) U.S. Cl. ........ 526/247; 526/242; 526/266; 526/270; 526/332; 526/333; 524/462; 524/544; 524/548; 524/549; 525/326.2; 525/326.4

(58) Field of Classification Search .................. 526/242, 526/246, 250, 253, 247; 528/402, 401
See application file for complete search history.

(56) References Cited

U.S. PATENT DOCUMENTS

| | | | | |
|---|---|---|---|---|
| 4,910,276 A | * | 3/1990 | Nakamura et al. | 526/247 |
| 5,502,132 A | * | 3/1996 | Sugiyama et al. | 526/247 |
| 5,688,879 A | * | 11/1997 | DeSimone | 526/89 |
| 5,783,636 A | * | 7/1998 | Koike et al. | 525/199 |
| 6,221,247 B1 | * | 4/2001 | Nemser et al. | 210/321.6 |
| 6,221,987 B1 | * | 4/2001 | Sugiyama | 526/231 |
| 6,225,382 B1 | * | 5/2001 | Matsukura et al. | 524/100 |
| 6,266,475 B1 | * | 7/2001 | Suzuki et al. | 385/145 |
| 2005/0009944 A1 | | 1/2005 | Apostolo et al. | |

FOREIGN PATENT DOCUMENTS

| | | |
|---|---|---|
| EP | 303 298 A  * | 2/1989 |
| EP | 1 469 016 A1 | 10/2004 |
| JP | 58-38707 | 3/1983 |
| JP | 63-18964 | 4/1988 |
| JP | 63-238111 | 10/1988 |
| JP | 63-238115 | 10/1988 |
| JP | 3-252474 | 11/1991 |
| JP | 3-252474 A  * | 11/1991 |
| JP | 5-140400 | 6/1993 |
| JP | 6-157493  * | 6/1994 |
| JP | 6-322213 A  * | 11/1994 |
| JP | 7-11087 A  * | 1/1995 |
| JP | 7-316235  * | 12/1995 |
| JP | 10-72508 | 3/1998 |
| JP | 11-152310 | 6/1999 |
| JP | 11-246726 | 9/1999 |
| JP | 2003-40938 | 2/2003 |
| WO | WO 2004/092235 A1 | 10/2004 |

OTHER PUBLICATIONS

Toda et al. (JP 7-11087) Jan. 1995; abstract and translation in English.*
Sugiyama et al. (JP 6-322213) Nov. 1994; abstract and translation in English.*
Unoki et al. (JP 3-252474) Nov. 1991; abstract and translation in English.*

* cited by examiner

*Primary Examiner* — Rip A. Lee
(74) *Attorney, Agent, or Firm* — Oblon, Spivak, McClelland, Maier & Neustadt, L.L.P.

(57) ABSTRACT

To provide an amorphous fluorinated polymer which is soluble in a fluorinated solvent having a boiling point of at most 70° C., and a fluorinated polymer composition containing it. An amorphous fluorinated polymer characterized by having a fluorine content of at least 50 mass % and an intrinsic viscosity of at least 0.03 g/dL and less than 0.05 dL/g as measured in perfluoro(2-butyltetrahydrofuran) at 30° C.

7 Claims, No Drawings

FLUORINATED POLYMER AND FLUORINATED POLYMER COMPOSITION CONTAINING IT

CROSS-REFERENCE TO RELATED APPLICATIONS

The present application is a continuation of PCT Application PCT/JP2006/325113, filed Dec. 15, 2006, and claims the benefits of priority to Japanese Patent Application 2006-000324, filed Jan. 5, 2006.

TECHNICAL FIELD

The present invention relates to a fluorinated polymer having improved solubility in a fluorinated solvent, and a fluorinated polymer composition containing it. A fluorinated polymer composition of the present invention is suitable as various coating materials.

BACKGROUND ART

A fluorinated polymer has useful characteristics such as high transparency, low refractive index and low surface tension. A fluorinated polymer composition having the fluorinated polymer dissolved in a specific solvent, is known and has been used as a coating material for various applications. In Patent Document 1, a resin composition for coating is disclosed, which comprises a polymer having a fluorinated aliphatic ring structure having an intrinsic viscosity in a specific range, and a solvent which dissolves the polymer, as essential components.

However, a solvent which is possibly used for dissolving such a polymer described in Patent Document 1, is limited to a special solvent such as a solvent completely fluorinated or a solvent having a perfluoroalkyl group having at least 5 carbon atoms, and such limitation prevented expansion of its application. Further, many of such solvents cause a concern that they tend to function as greenhouse effect gases or a concern that they tend to cause formation of the ozone holes, whereby there was a need for a fluorinated polymer which is soluble in a wide range of fluorinated solvents, and which is suitable as a coating material.

Patent Document 1: JP-A-3-252474

DISCLOSURE OF THE INVENTION

Object to be Accomplished by the Invention

In order to solve the problems of the prior art, the present invention has an object to provide a fluorinated polymer having improved solubility in a fluorinated solvent, more specifically, to provide an amorphous fluorinated polymer which is soluble in a fluorinated solvent having a boiling point of at most 70° C., and a fluorinated polymer composition containing it.

Means to Accomplish the Object

Namely, the present invention provides the following.
(1) An amorphous fluorinated polymer characterized by having a fluorine content of at least 50 mass % and an intrinsic viscosity of at least 0.03 dL/g and less than 0.05 dL/g as measured in perfluoro(2-butyltetrahydrofuran) at 30° C.
(2) The amorphous fluorinated polymer according to the above (1), which has a fluorinated ring structure in the main chain.
(3) The amorphous fluorinated polymer according to the above (2), wherein the above fluorinated ring structure is a fluorinated aliphatic ring structure, a fluorinated triazine ring structure or a fluorinated aromatic ring structure.
(4) The amorphous fluorinated polymer according to any one of the above (1) to (3), which is a fluorinated polymer containing units obtained by cyclopolymerization of at least one fluorinated monomer selected from a group consisting of perfluoro(allyl vinyl ether) and perfluoro(butenyl vinyl ether).
(5) The amorphous fluorinated polymer according to any one of the above (1) to (3), which is a fluorinated polymer containing polymerized units based on at least one fluorinated monomer selected from a group consisting of perfluoro(2,2-dimethyl-1,3-dioxol), perfluoro(4-methyl-1,3-dioxol), perfluoro(1,3-dioxol), perfluoro(2,3-dimethyl-1,4-dioxine), perfluoro(2,3-dihydro-1,4-dioxine), perfluoro(2-methylene-4,5-dimethyl-1,3-dioxolan) and perfluoro(2-methylene-1,3-dioxolan).
(6) A fluorinated polymer composition comprising the amorphous fluorinated polymer as defined in any one of the above (1) to (5), and a fluorinated solvent having at least 3 carbon atoms and from 5 to 10 fluorine atoms.
(7) The fluorinated polymer composition according to the above (6), which contains from 0.01 to 10 mass % of the above amorphous fluorinated polymer.
(8) The fluorinated polymer composition according to the above (6) or (7), wherein the fluorinated solvent contains at least one member selected from a group consisting of $CF_3CF_2CHCl_2$, $CClF_2CF_2CHClF$, $CF_3CF_2CHFCHFCF_3$, $CF_3CF_2CF_2CF_2CH_2CH_3$, $CF_3CF_2CF_2CF_2OCH_3$, $CF_3CF_2CF_2CF_2OC_2H_5$ and $CF_3CH_2OCF_2CF_2H$.

Effects of the Invention

The fluorinated polymer of the present invention has its solubility in a fluorinated solvent improved, so that it can be dissolved in a wider range of solvents than the conventional fluorinated polymer. Therefore, when it is used as a coating material, it is possible to select a type of the fluorinated solvent having an excellent environmental compatibility.

The fluorinated polymer of the present invention is soluble in a fluorinated solvent which was not usable as a solvent for the conventional fluorinated polymer, because of a solubility problem. A fluorinated polymer composition comprising the fluorinated polymer of the present invention and such a new fluorinated solvent, is suitable as a coating material.

When the fluorinated polymer composition of the present invention, is used as a coating material, it is excellent in fast drying after dipping or potting. Further, the coating material does not drip after dipping, and the thickness of a coating to be formed is excellent in uniformity.

BEST MODE FOR CARRYING OUT THE INVENTION

Now, the present invention will be described in detail.
The fluorinated polymer of the present invention is not particularly limited as long as it is an amorphous fluorinated polymer which satisfies the following 2 conditions.
(1) A fluorine content is at least 50 mass %.
(2) An intrinsic viscosity of at least 0.03 dL/g and less than 0.05 dL/g as measured in perfluoro(2-butyltetrahydrofuran) at 30° C.
The fluorine content in the fluorinated polymer means the mass % of fluorine atoms contained in the polymer, based on the total mass of the fluorinated polymer.

In a case where the fluorine content in the fluorinated polymer is at least 50 mass %, when it is used as a coating material, it is possible to obtain an effect such that the coating to be formed will have high transparency, low refractive index or low surface energy.

The fluorine content in the fluorinated polymer is preferably at least 60 mass %, further preferably at least 65 mass %.

In the present invention, the intrinsic viscosity is used as an index for the molecular weight of the fluorinated polymer.

The fluorinated polymer of the present invention has an intrinsic viscosity of at least 0.03 dL/g and less than 0.05 dL/g, more preferably at least 0.04 dL/g and less than 0.05 dL/g, as measured in perfluoro(2-butyltetrahydrofuran) at 30° C. If the intrinsic viscosity is less than 0.03 dL/g, when the fluorinated polymer is used as a coating material, there will be a problem such that the resulting coating will be brittle. On the other hand, if the intrinsic viscosity is 0.05 dL/g or higher, there will be a problem such that the solubility in the fluorinated solvent will decrease.

The fluorinated polymer of the present invention preferably has a fluorinated ring structure in the main chain. To "have a fluorinated ring structure in the main chain" means to have a structure wherein at least one carbon atom forming the ring, is the carbon atom in a carbon chain forming the main chain, and a fluorine atom or a fluorine-containing group is bonded to at least one of carbon atoms forming the ring.

The fluorinated ring structure may, for example, be a fluorinated aliphatic ring structure, a fluorinated triazine ring structure or a fluorinated aromatic ring structure. Among them, a fluorinated aliphatic ring structure is preferred.

Now, the fluorinated polymer having a fluorinated aliphatic ring structure in the main chain, will be described.

To "have a fluorinated aliphatic ring structure in the main chain" means to have a structure wherein at least one carbon atom forming the aliphatic ring, is the carbon atom in a carbon chain forming the main chain, and a fluorine atom or a fluorine-containing group is bonded to at least one of carbon atoms forming the aliphatic ring.

As the fluorinated polymer having a fluorinated aliphatic ring structure in the main chain, a fluorinated polymer obtained by polymerizing a monomer having a fluorinated ring structure, or a fluorinated polymer obtained by cyclopolymerizing a fluorinated monomer having two or more polymerizable double bonds, is suitable.

The fluorinated polymer of the present invention has a fluorinated aliphatic ring structure in the main chain, but it may also, for example, be one containing at least one of the following fluorinated comonomers.

(a) A $C_{2-8}$ perfluoroolefin such as tetrafluoroethylene or hexafluoropropene.

(b) A $C_{2-8}$ chlorofluoroolefin such as chlorotrifluoroethylene.

(c) A (per)fluoroalkyl vinyl ether represented by $CF_2=CFOR_f$, wherein $R_f$ is a $C_{1-6}$ (per)fluoroalkyl group, such as $CF_3$, $C_2F_5$ or $C_3F_7$.

(d) A (per)fluorooxyalkyl vinyl ether represented by $CF_2=CFOX$, wherein X is a $C_{1-12}$ alkyl group, a $C_{1-12}$ oxyalkyl group, or a $C_{1-12}$ (per)fluorooxyalkyl group having at least one ether group, such as a perfluoro-2-propoxypropyl group.

(e) A fluorosulfonic monomer selected from the following: $CF_2=CFOCF_2CF_2SO_2F$, $CF_2=CFO(CF_2CYFO)_n CF_2CF_2SO_2F$ (wherein Y is Cl, F or $CF_3$, and n is from 1 to 10), and $CF_2=CFOCF_2CF_2CF_2SO_2F$.

A polymer having a fluorinated aliphatic ring structure in the main chain, obtained by polymerizing a monomer having a fluorinated aliphatic ring structure, is known by e.g. JP-B-63-18964.

That is, it is possible to obtain the polymer having a fluorinated aliphatic ring structure in the main chain, by homopolymerizing a monomer having a fluorinated aliphatic ring structure, such as perfluoro(2,2-dimethyl-1,3-dioxol), perfluoro(4-methyl-1,3-dioxol) or perfluorodioxol, or by copolymerizing such a monomer with a radical polymerizable monomer, such as tetrafluoroethylene, chlorotrifluoroethylene or perfluoro(methyl vinyl ether).

Further, a polymer having a fluorinated aliphatic ring structure in the main chain, obtained by cyclopolymerizing a fluorinated monomer having two or more polymerizable double bonds, is known by e.g. JP-A-63-238111 or JP-A-63-238115.

That is, the polymer having a fluorinated aliphatic ring structure in the main chain, is obtained by cyclopolymerizing a monomer such as perfluoro(allyl vinyl ether) or perfluoro(butenyl vinyl ether), or by copolymerizing such a monomer with a radical polymerizable monomer, such as tetrafluoroethylene, chlorotrifluoroethylene or perfluoro(methyl vinyl ether).

Further, the polymer having a fluorinated aliphatic ring structure in the main chain is also obtained by copolymerizing a monomer having a fluorinated aliphatic ring structure, such as perfluoro(2,2-dimethyl-1,3-dioxol) with a fluorinated monomer having two or more polymerizable double bonds, such as perfluoro(allyl vinyl ether) or perfluoro(butenyl vinyl ether).

The fluorinated polymer of the present invention is preferably one containing at least 20 mol %, preferably at least 40 mol %, in the total polymerized units, of polymerized units having a fluorinated aliphatic ring structure in the main chain, from the viewpoint of e.g. transparency or mechanical characteristics. Further, the above polymerized units are contained preferably at least 60 mol %, most preferably at least 80 mol %.

Specifically, the polymer having a fluorinated aliphatic ring structure in the main chain may, for example, be one having repeating units selected from the following general formulae (1) to (4). Fluorine atoms in such a polymer having a fluorinated aliphatic ring structure in the main chain, may be partially replaced by chlorine atoms to increase the refractive index.

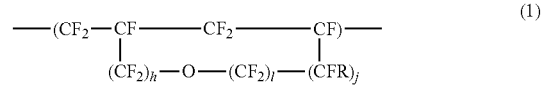

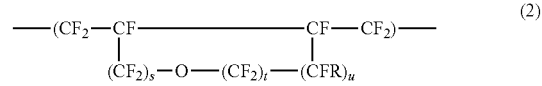

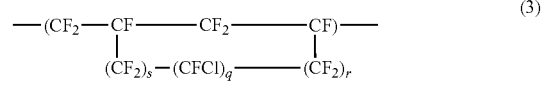

In the general formulae (1) to (4), h is an integer of from 0 to 5, i is an integer of from 0 to 4, j is 0 or 1, h+i+j is from 1 to 6, s is an integer of from 0 to 5, t is an integer of from 0 to 4, u is 0 or 1, s+t+u is from 1 to 6, each of p, q and r is independently an integer of from 0 to 5, p+q+r is from 1 to 6, and each of R, $R^1$, $R^2$, $X^1$ and $X^2$, is independently F, Cl, D (deuterium) or $CF_3$.

The monomer having a fluorinated aliphatic ring structure in the main chain, is preferably a monomer selected from compounds represented by the following general formulae (5) to (7). Such a monomer is a perfluoro(1,3-dioxol), a perfluoro(2,3-dihydro-1,4-dioxine) or a perfluoro(2-methylene-1,3-dioxolan).

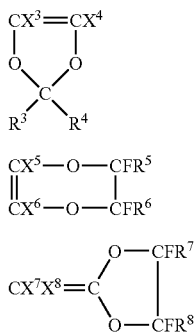

(5)

(6)

(7)

In the general formulae (5) to (7), each of $X^3$ to $X^8$ and $R^3$ to $R^8$ is independently F, Cl, D or $CF_3$, and each pair of $R^3$ and $R^4$, $R^5$ and $R^6$, and $R^7$ and $R^8$, may be connected to form a ring.

Specific examples for the compounds of the general formulae (5) to (7), may be compounds of the formulae (11) to (18).

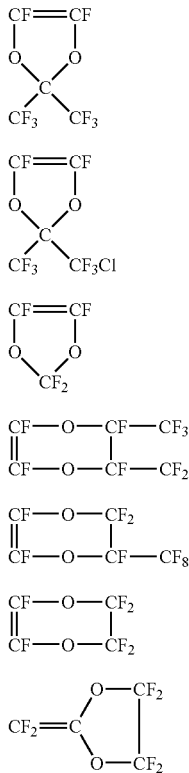

(11)

(12)

(13)

(14)

(15)

(16)

(17)

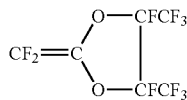

(18)

The fluorinated polymer of the present invention is preferably a fluorinated polymer containing polymerized units based on at least one fluorinated monomer selected from the group consisting of perfluoro(2,2-dimethyl-1,3-dioxol), perfluoro(4-methyl-1,3-dioxol), perfluoro(1,3-dioxol), perfluoro(2,3-dimethyl-1,4-dioxine), perfluoro(2,3-dihydro-1,4-dioxine), perfluoro(2-methylene-4,5-dimethyl-1,3-dioxolan) and perfluoro(2-methylene-1,3-dioxolan).

The above monomers having two or more polymerizable double bonds, are preferably compounds of the following general formulae (8) to (10).

$$CY^1Y^2=CY^3OCY^4Y^5CY^6Y^7CY^8=CY^9Y^{10} \quad (8)$$

$$CZ^1Z^2=CZ^3OCZ^4Z^5CZ^6=CZ^7Z^8 \quad (9)$$

$$CW^1W^2=CW^3OCW^4W^5OCW=CW^7W^8 \quad (10)$$

In the general formulae (8) to (10), each of $Y^1$ to $Y^{10}$, $Z^1$ to $Z^8$ and $W^1$ to $W^8$, is independently selected from F, Cl, D and $CF_3$.

Specific examples for the compounds of the general formulae (8) to (10), may be the following compounds:
$CF_2=CFOCF_2CF_2CF=CF_2$,
$CF_2=CFOCD_2CF_2CF=CF_2$,
$CF_2=CFOCCl_2CF_2CF=CF_2$, $CF_2=CFOCF_2CF_2CD=CF_2$,
$CF_2=CFOCF_2CF_2CCl=CF_2$,
$CF_2=CFOCF_2CFDCF=CF_2$,
$CF_2=CFOCF_2CFClCF=CF_2$,
$CF_2=CFOCF_2CF_2CF=CFCl$, $CF_2=CFOCF_2CF(CF_3)CF=CF_2$, $CF_2=CFOCF_2CF(CF_3)CD=CF_2$,
$CF_2=CFOCF_2CF(CF_3)CCl=CF_2$,
$CF_2=CFOCF_2CF=CF_2$, $CF_2=CFOCF(CF_3)CF=CF_2$,
$CF_2=CFOCF_2OCF=CF_2$, $CF_2=CDOCF_2CCD=CF_2$,
$CF_2=CClOCF_2OCCl=CF_2$, $CF_2=CFOCD_2OCF=CF_2$,
$CF_2=CFOCCl_2OCF=CF_2$ and $CF_2=CFOC(CF_3)_2OCF=CF_2$.

The fluorinated polymer of the present invention is preferably a fluorinated polymer containing cyclopolymerized units of at least one fluorinated monomer selected from the group consisting of perfluoro(allyl vinyl ether) and perfluoro(butenyl vinyl ether).

In the present invention, a method by usual radical polymerization is used as a polymerization method to obtain the fluorinated polymer of the present invention by polymerizing a monomer having a fluorinated ring structure, or to obtain the fluorinated polymer of the present invention by cyclopolymerizing a fluorinated monomer having two or more polymerizable double bonds. For example, the polymerization may be carried out by an organic and/or inorganic radical initiator, light, ionizing radiation or heat. As the radical initiator, an organic azo compound, an organic peroxide such as diisopropyl peroxydicarbonate, an inorganic peroxide or a redox type initiator, may be selected for use.

Further, for radical polymerization, the polymerization method is not particularly limited, and it may, for example, be a solution polymerization in an organic solvent which dissolves the monomer, an suspension polymerization which is carried out in an aqueous medium in the presence or absence of a proper organic solvent, or an emulsion polymerization which is carried out by adding an emulsifier to an aqueous medium. The polymerization temperature and pressure are also not particularly limited, and it is desirable to properly select them in consideration of factors such as the boiling point of a monomer, the heat source required and removal of the polymerization heat. For example, suitable temperature setting may be carried out between 0° C. and 200° C., and practically suitable temperature setting may be carried out between room temperature and 100° C. Further, suitable polymerization may be carried out either under reduced pressure or increased pressure, and practically suitable polymerization may be carried out under from normal pressure to about 50 atms.

The intrinsic viscosity of the fluorinated polymer of the present invention is adjusted to be at least 0.03 dL/g and less than 0.05 dL/g by a method of e.g. reducing the monomer concentration at the time of polymerization, increasing the concentration of an initiator or adding a chain transfer agent. Among them, the method of adding a chain transfer agent is preferred, since the intrinsic viscosity may be easily adjusted to the desired range.

As the chain transfer agent, one having a chain transfer coefficient of at least $1\times10^{-6}$ and less than $1\times10^{-3}$ (60° C.), to methyl methacrylate, is suitably used. If the chain transfer coefficient is not in the above range, it is difficult to adjust the intrinsic viscosity of the fluorinated polymer to be at least 0.03 dL/g and less than 0.05 dL/g. A specific example for the chain transfer agent, may be an alcohol such as methanol (chain transfer coefficient: $2\times10^{-5}$) and ethanol (chain transfer coefficient: $4\times10^{-5}$).

The fluorinated polymer obtained by using the polymerization initiator or the chain transfer agent, has unstable terminal groups derived from the polymerization initiator or the chain transfer agent. It is preferred that the fluorinated polymer having such unstable terminal groups, is subjected to conversion of the unstable terminal groups to stable terminal groups by using a method described in JP-A-11-152310, and then the obtained fluorinated polymer is dissolved in a fluorinated solvent and used as a coating material. However, the treatment is not limited to this method, and other treatments may be applied to the fluorinated polymer. A specific example for other treatments, may be heat treatment, reacting the unstable terminal group with water to form a carboxylic acid, or reacting the unstable terminal group with an alcohol to form an ester.

The fluorinated polymer of the present invention is soluble in a wide range of fluorinated solvents. For example, the fluorinated polymer of the present invention is soluble in a fluorinated solvent known as a solvent for conventional fluorinated polymers, such as a completely fluorinated solvent or a solvent having a perfluoroalkyl group having at least 5 carbon atoms. Specific examples for such a fluorinated solvent, may be fluorinated solvents of the following (1) and (2).

(1) A fluorinated solvent of the general formula R1-O—R2 described in JP-A-11-246726. In the above general formula, R1 is a $C_{1-5}$ linear or branched perfluoroalkyl group which may contain etheric bond, and R2 is a $C_{1-5}$ linear or branched alkyl group. Specific examples for the fluorinated solvent of the above general formula, may be the following.

$F(CF_2)_5OCH_3$, $F(CF_2)_6OCH_3$, $F(CF_2)_7OCH_3$, $F(CF_2)_8OCH_3$, $F(CF_2)_9OCH_3$, $F(CF_2)_{10}OCH_3$, $H(CF_2)_6OCH_3$, $(CF_3)_2CF(OCH_3)CFCF_2CF_3$, $F(CF_2)_3OCF(CF_3)CF_2OCH_3$, $F(CF_2)_3OCF(CF_3)CF_2OCF(CF_3)CF_2OCH_3$, $F(CF_2)BOCH_2CH_2CH_3$, $(CF_3)_2CFCF_2CF_2OCH_3$ and $F(CF_2)_2O(CF_2)_4OCH_2CH_3$.

(2) A fluorinated solvent comprising a block compound of the general formula Rf-Rh described as in JP-A-5-140400. In the above general formula, Rf is a $C_{6-12}$ perfluoroalkyl group, and specifically, it may for example, be $CF_3(CF_2)_n$-(n=5 to 11), $(CF_3)_2CF(CF_2)_m$— (m=3 to 9), $CF_3CF_2CF(CF_3)(CF_2)_k$-(k=2 to 8), or $(CF_3CF_2)_2CF(CF_2)_p$-(p=1 to 7). Rh is a $C_{1-4}$ alkyl or alkenyl group, and specifically, it may, for example, be —$CH_3$, —$CH_2CH_3$, —$CH=CH_2$, —$CH_2CH=CH_2$, —$CH=CHCH_3$, —$C(CH_3)=CH_2$, —$CH_2CH_2CH_3$, —$CH_2CH_2CH=CH_2$, —$CH_2CH=CHCH_3$, —$CH=CHCH_2CH_3$ or —$CH_2CH_2CH_2CH_3$.

The fluorinated solvent of the above (1) may be used alone. Otherwise, it may be used in combination with other solvents. Such other solvents which may be used in combination may, for example, be a fluorinated ether such as $F(CF_2)_4OCH_3$ or $F(CF_2)_4OC_2H_5$, a hydrocarbon such as hexane, a hydrochlorocarbon such as chloroform, a hydrochlorofluorocarbon such as dichloropentafluoropropane, a fluorinated aromatic hydrocarbon such as meta-xylene hexafluoride or benzotrifluoride, and an alcohol such as methanol, ethanol, (perfluorohexyl)ethanol or pentafluoropropanol. When such other solvents are used in combination, they are preferably from 0.1 to 50 parts by mass, more preferably from 1 to 30 parts by mass, based on 100 parts by mass of the fluorinated solvent of the above (1).

The fluorinated polymer of the present invention has excellent solubility in such a fluorinated solvent, as compared with a conventional fluorinated polymer. Therefore, in such a fluorinated solvent, it is possible to dissolve much more amount than the conventional fluorinated polymer. For example, in JP-A-11-246726, the concentration of the fluorinated polymer in a fluorinated polymer composition made by dissolving the conventional fluorinated polymer in the fluorinated solvent of the above (1), was from 0.01 to 50 mass %, more preferably from 0.1 to 20 mass %. On the other hand, in the case of the fluorinated polymer of the present invention, it is possible to have the polymer contained from 0.01 to 55 mass %, in the fluorinated solvent of the above (1).

Further, in Examples in JP-A-5-140400, the conventional fluorinated polymer is dissolved in the fluorinated solvent of the above (2), to obtain a composition having the solid concentration of 9% or 8.3%, but in the case of the fluorinated polymer of the present invention, it is possible to contain from 0.01 to 20 mass % of the polymer, based on the fluorinated solvent of the above (2).

Further, the fluorinated polymer of the present invention is soluble in a fluorinated solvent which was not usable as a solvent for the conventional fluorinated polymer, because of a solubility problem. A specific example for such a fluorinated solvent, may be a fluorinated solvent having a boiling point of at most 70° C. The fluorinated polymer of the present invention is soluble in a fluorinated solvent having at least 3 carbon atoms and 5 to 10 fluorine atoms, including the fluorinated solvent having the boiling point of at most 70° C.

In addition, the fluorinated solvent having at least 3 carbon atoms and 5 to 10 fluorine atoms, may include one having a boiling point of at least 70° C., but the solvent having a boiling point of at least 70° C. was also not usable as a solvent for the conventional fluorinated polymer.

Specific examples for the fluorinated solvent having at least 3 carbon atoms and 5 to 10 fluorine atoms, may be the following.

$CF_3CF_2CHCl_2$ (HCFC225ca) (boiling point: 53° C.), $CClF_2CF_2CHClF$ (HCFC225cb) (boiling point: 56° C.), $CF_3CF_2CHFCHFCF_3$ (boiling point: 55° C.), $CF_3CF_2CF_2CH_2CH_3$ (boiling point: 68° C.), $CF_3CF_2CF_2CF_2OCH_3$ (boiling point: 61° C.), $CF_3CF_2CF_2CF_2OC_2H_5$ (boiling point: 76° C.) and $CF_3CH_2OCF_2CF_2H$ (boiling point: 56° C.).

Such fluorinated solvents may be used alone or in combination as a mixture of two or more of them. Further, they may be used in combination with the fluorinated solvent of the above (1) or (2).

The fluorinated solvent preferably contains at least one member selected from the group consisting of $CF_3CF_2CHCl_2$, $CClF_2CF_2CHClF$, $CF_3CF_2CHFCHFCF_3$, $CF_3CF_2CF_2CF_2CH_2CH_3$, $CF_3CF_2CF_2CF_2OCH_3$, $CF_3CF_2CF_2CF_2OC_2H_5$ and $CF_3CH_2OCF_2CF_2H$.

The fluorinated polymer composition of the present invention comprises the fluorinated polymer of the present invention and the fluorinated solvent having at least 3 carbon atoms and 5 to 10 fluorine atoms.

As the fluorinated solvent having at least 3 carbon atoms and 5 to 10 fluorine atoms, it is possible to use any one of the above exemplified ones. Further, one or more of the above exemplified fluorinated solvents may be used.

The fluorinated polymer composition of the present invention, may contain the fluorinated solvent of the above (1) or (2) in addition to the fluorinated solvent having at least 3 carbon atoms and 5 to 10 fluorine atoms. In such a case, the proportion of the fluorinated solvent having at least 3 carbon atoms and 5 to 10 fluorine atoms, is preferably from 60 to 100 mass %, further preferably from 80 to 100 mass %, in the total amount of the fluorinated solvents.

The fluorinated polymer composition of the present invention contains the fluorinated polymer in an amount of preferably from 0.01 to 10 mass %, more preferably from 0.1 to 5 mass %. In a case where the fluorinated polymer of the present invention is contained in an amount of from 0.1 to 5 mass %, it is possible to obtain an effect such that when the fluorinated polymer composition is used as a coating material, the uniform coating will easily be formed.

Into the fluorinated polymer composition of the present invention, various additives such as an antioxidant, an ultraviolet stabilizer, etc., may be added to improve practicability.

The fluorinated polymer composition of the present invention is suitable as a coating material for various applications. When the fluorinated polymer composition of the present invention, is used as a coating material, it is possible to use any coating method to form a coating, such as brush-coating, coating using a doctor blade or a bar coater, spray-coating, dipping, potting or spin-coating. It is preferred to use spin-coating for a film which requires particular smoothness. When it is desired to form a relatively thick film in a small area, such as a protective film for a semiconductor chip, coating by potting is preferred, wherein a highly concentrated solution is subjected to direct dropping.

When the fluorinated polymer composition of the present invention is used as a coating material, a film formed will be excellent in transparency.

Further, the fluorinated polymer composition of the present invention contains a fluorinated solvent having the low boiling point, i.e. mainly a fluorinated solvent having a boiling point of at most 70° C., whereby when it is used as a coating material, it is excellent in fast drying after dipping or potting. Further, the coating material does not drip after dipping, and the thickness of a coating formed is excellent in uniformity.

EXAMPLES

Now, the present invention will be described in further detail with reference to Examples and Comparative Examples, but it should be understood that the present invention is by no means restricted thereto.

Example 1

Into a pressure-proof glass autoclave having an internal volume of 200 mL, 35 g of perfluoro(butenyl vinyl ether), 200 g of deionized water, 40 g of methanol as a chain transfer agent and 21.3 g of diisopropyl peroxydicarbonate (($CH_3$)$_2$CHOCOO) as a polymerization initiator, were introduced. The interior was replaced with nitrogen for 3 times, and then suspension polymerization was carried out at 50° C. for 20 hours, to obtain a polymer having terminal groups derived from the polymerization initiator. The polymer was heated at 320° C. for 60 minutes. Then, by using the method described in JP-A-11-152310, unstable terminal groups were converted to stable terminal groups. Specifically, the polymer was introduced into a nickel autoclave, and the interior was replaced with nitrogen for 3 times and then, the pressure was reduced. Then, fluorine gas diluted to 20% by nitrogen, was introduced until 0.7 MPa·G, followed by treatment at 195° C. for 10 hours, whereby 33 g of a fluorinated polymer (fluorine content: 68 mass %) having unstable terminal groups converted to stable terminal groups, was obtained.

The intrinsic viscosity of the above fluorinated polymer was measured by using perfluoro(2-butyl tetrahydrofuran) as a measuring solvent at 30° C. as a measuring temperature, whereby it was 0.05 dL/g.

Into a glass flask, 10 g of the above fluorinated polymer and 90 g of a fluorinated solvent HCFC225cb were introduced, followed by heating and stirring at 30° C. for 24 hours, whereby the mixture was dissolved, and a clear solution (fluorinated polymer composition) was obtained.

Further, 0.3 g of the above fluorinated polymer was dissolved in 9.7 g of perfluorotributyl amine, to obtain a 3 mass % solution (fluorinated polymer composition). The obtained solution was spin-coated on a synthetic quartz substrate, and when the transmittance at 193 nm was measured by using KV-201AD type extreme ultraviolet spectrophotometer device manufactured by Bunkoh-Keiki Co., LTD., the transmittance of the formed coating film as converted to a film thickness of 200 nm, was at least 90%.

Example 2

Into a pressure-proof glass autoclave having an internal volume of 200 mL, 90 g of perfluoro(butenyl vinyl ether), 90 g of HFC52-13p($CF_3(CF_2)_4CF_2H$) as a solvent, 1 g of methanol as a chain transfer agent and 1.5 g of diisopropyl peroxydicarbonate (($CH_3$)$_2$CHOCOO) as a polymerization initiator, were introduced. The interior was replaced with nitrogen for 3 times, and then polymerization was carried out at 40° C. for 48 hours, to obtain a polymer having terminal groups derived from the polymerization initiator and the chain transfer agent. The polymer solution was poured into methanol, and the polymer was precipitated and purified. The obtained powder was vacuum-dried and then heated at 320° C. for further 60 minutes. Then, by using the method described in JP-A-11-152310, unstable terminal groups were converted to stable terminal groups. Specifically, the polymer was introduced into a nickel autoclave, and the interior was replaced with nitrogen for 3 times and then, the pressure was reduced. Then, fluorine gas diluted to 20% by nitrogen, was introduced until 0.7 MPa·G, followed by treatment at 195° C. for 10 hours, whereby 50 g of a fluorinated polymer (fluorine content: 68 mass %) having unstable terminal groups converted to stable terminal groups, was obtained.

The intrinsic viscosity of the above fluorinated polymer was measured by using perfluoro(2-butyl tetrahydrofuran) as a measuring solvent at 30° C. as a measuring temperature, whereby it was 0.05 dL/g.

Into a glass flask, 10 g of the above fluorinated polymer and 90 g of a fluorinated solvent HCFC225cb were introduced, followed by heating and stirring at 30° C. for 24 hours, whereby the mixture was dissolved, and a clear solution (fluorinated polymer composition) was obtained.

Further, a coating film of the above fluorinated polymer was prepared in the same manner as in Example 1, and the transmittance was measured. As converted to a film thickness of 200 nm, the transmittance was at least 90%.

Comparative Example 1

Into a pressure-proof glass autoclave having an internal volume of 200 mL, 90 g of perfluoro(butenyl vinyl ether), 90 g of HFCS2-13p($CF_3(CF_2)_4CF_2H$) as a solvent, 0.3 g of methanol as a chain transfer agent and 1.5 g of diisopropyl peroxydicarbonate (($CH_3)_2CHOCOO$) as a polymerization initiator, were introduced. The interior was replaced with nitrogen for 3 times, and then polymerization was carried out at 40° C. for 48 hours, to obtain a polymer having terminal groups derived from the polymerization initiator and the chain transfer agent. Thereafter, in the same manner as in Examples, 70 g of a fluorinated polymer (fluorine content: 68 mass %) having unstable terminal groups converted to stable terminal groups, was obtained.

The intrinsic viscosity of the above fluorinated polymer was measured by using perfluoro(2-butyl tetrahydrofuran) as a measuring solvent at 30° C. as a measuring temperature, whereby it was 0.09 dL/g.

Into a glass flask, 10 g of the above fluorinated polymer and 90 g of a fluorinated solvent HCFC225cb were introduced, followed by heating and stirring at 30° C. for 24 hours, whereby a solution obtained was a turbid liquid having precipitates observed on the bottom. Further, even though the solution was treated with ultrasonic waves, the precipitates did not dissolve.

Further, a coating film of the above fluorinated polymer was prepared in the same manner as in Example 1, and the transmittance was measured. As converted to a film thickness of 200 nm, the transmittance was at least 90%.

Comparative Example 2

Into a pressure-proof glass autoclave having an internal volume of 200 mL, 90 g of perfluoro(butenyl vinyl ether), 90 g of HFC52-13p($CF_3(CF_2)_4CF_2H$) as a solvent, 0.6 g of methanol as a chain transfer agent and 1.5 g of diisopropyl peroxydicarbonate (($CH_3)_2CHOCOO$) as a polymerization initiator, were introduced. The interior was replaced with nitrogen for 3 times, and then polymerization was carried out at 40° C. for 48 hours, to obtain a polymer having terminal groups derived from the polymerization initiator and the chain transfer agent. Thereafter, in the same manner as in Examples, 65 g of a fluorinated polymer (fluorine content: 68 mass %) having unstable terminal groups converted to stable terminal groups, was obtained.

The intrinsic viscosity of the above fluorinated polymer was measured by using perfluoro(2-butyl tetrahydrofuran) as a measuring solvent at 30° C. as a measuring temperature, whereby it was 0.065 g/dL.

Into a glass flask, 10 g of the above fluorinated polymer and 90 g of a fluorinated solvent HCFC225cb were introduced, followed by heating and stirring at 30° C. for 24 hours, whereby a solution obtained was a liquid having a slight tubidity. Further, when the solution was stored at room temperature for 24 hours, the precipitates were observed on the bottom.

Further, a coating film of the above fluorinated polymer was prepared in the same manner as in Example 1, and the transmittance was measured. As converted to a film thickness of 200 nm, the transmittance was at least 90%.

INDUSTRIAL APPLICABILITY

The present invention provides an amorphous fluorinated polymer having improved solubility in a fluorinated solvent having a boiling point of at most 70° C., and a solvent composition containing the amorphous fluorinated polymer is useful as a coating agent for various applications.

The entire disclosure of Japanese Patent Application No. 2006-000324 filed on Jan. 5, 2006 including specification, claims and summary is incorporated herein by reference in its entirety.

What is claimed is:

1. An amorphous fluorinated polymer having a fluorinated ring structure in a main chain, the fluorinated ring structure being a fluorinated aliphatic ring structure,
   wherein the amorphous fluorinated polymer comprises units obtained by cyclopolymerization of at least one fluorinated monomer selected from the group consisting of perfluoro(allyl vinyl ether) and perfluoro(butenyl vinyl ether), and
   the amorphous fluorinated polymer has a fluorine content of at least 50 mass % and an intrinsic viscosity of at least 0.03 dL/g and less than 0.05 dL/g as measured in perfluoro(2-butyltetrahydrofuran) at 30° C.

2. The amorphous fluorinated polymer according claim 1, which is a fluorinated polymer comprising polymerized units based on at least one fluorinated monomer selected from the group consisting of perfluoro(2,2-dimethyl-1,3-dioxol), perfluoro(4-methyl-1,3-dioxol), perfluoro(1,3-dioxol), perfluoro(2,3-dimethyl-1,4-dioxine), perfluoro(2,3-dihydro-1,4-dioxine), perfluoro(2-methylene-4,5-dimethyl-1,3-dioxolan) and perfluoro(2-methylene-1,3-dioxolan).

3. A fluorinated polymer composition comprising the amorphous fluorinated polymer as defined in claim 1, and a fluorinated solvent having at least 3 carbon atoms and from 5 to 10 fluorine atoms.

4. The fluorinated polymer composition according to claim 3, which comprises from 0.01 to 10 mass % of the amorphous fluorinated polymer.

5. The fluorinated polymer composition according to claim 3, wherein the fluorinated solvent comprises at least one member selected from the group consisting of $CF_3CF_2CHCl_2$, $CClF_2CHClF$, $CF_3CF_2CHFCHFCF_3$, $CF_3CF_2CF_2CF_2CH_2CH_3$, $CF_3CF_2CF_2CF_2OCH_3$, $CF_3CF_2CF_2CF_2OC_2H_5$ and $CF_3CH_2OCF_2CF_2H$.

6. The amorphous fluorinated polymer according to claim 1, which is obtained by copolymerization employing a chain transfer agent comprising an alcohol.

7. The amorphous fluorinated polymer according to claim 1, which has stable terminal groups converted from unstable terminal groups by a treatment with fluorine gas.

* * * * *

UNITED STATES PATENT AND TRADEMARK OFFICE
CERTIFICATE OF CORRECTION

PATENT NO. : 8,017,709 B2  
APPLICATION NO. : 12/168197  
DATED : September 13, 2011  
INVENTOR(S) : Nobuyuki Otozawa et al.

Page 1 of 1

It is certified that error appears in the above-identified patent and that said Letters Patent is hereby corrected as shown below:

On the title page, Item (63), the Related U.S. Application Data information is incorrect. Item (63) should read:

-- Related U.S. Application Data

(63) Continuation of application No. PCT/JP2006/325113, filed on Dec. 15, 2006. --

Signed and Sealed this  
Eighth Day of November, 2011

David J. Kappos  
*Director of the United States Patent and Trademark Office*